(12) United States Patent
Schenk et al.

(10) Patent No.: US 6,658,865 B2
(45) Date of Patent: Dec. 9, 2003

(54) METHOD AND DEVICE FOR COOLING COMPONENTS OF INSTALLATIONS

(75) Inventors: Christian Schenk, Ingelheim (DE); Siegbert Schell, Heidesheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/146,715

(22) Filed: May 15, 2002

(65) Prior Publication Data
US 2003/0000227 A1 Jan. 2, 2003

(30) Foreign Application Priority Data
May 15, 2001 (DE) .......................... 101 24 166

(51) Int. Cl.[7] .............................................. F25D 17/02
(52) U.S. Cl. .................. 62/64; 62/121; 62/314
(58) Field of Search .............................. 62/62, 64, 121, 62/314

(56) References Cited
U.S. PATENT DOCUMENTS
5,775,122 A * 7/1998 Waase .......................... 62/373
* cited by examiner Primary Examiner—Timothy L. Maust
Assistant Examiner—Malik N. Drake
(74) Attorney, Agent, or Firm—Pauley Petersen & Erickson

(57) ABSTRACT

A method for cooling components of installations charged with flowable media, in particular molding units for glass melts, and for direct cooling of molded glass parts. A stable cooling range between 60° C. and 280° C., such as is required in glass production, can be governed with the cooling medium, which is of a mixture of compressed and/or blower air and a water aerosol fog.

14 Claims, 1 Drawing Sheet

METHOD AND DEVICE FOR COOLING COMPONENTS OF INSTALLATIONS

BACKGROUND OF THE INVENTION

1. Field of the Invention

This invention relates to a method for cooling components of installations charged with flowable media, in particular molding units for glass melts, and/or for the direct cooling of molded glass parts. This invention further relates to a device for executing the method.

2. Description of Related Art

A basic problem in connection with molding glass is related to the selection and the temperature of the cooling medium for the molding unit. With indirect cooling, which acts on the glass melt through a cooling conduit and the customarily metallic molding unit, a temperature gradient is created leading to a resultant glass contact temperature, which logically lies between the glass temperature and the temperature of the cooling medium.

Cooling media, such as air, compressed air, or air from a blower, water and oils are customary cooling media. Each cooling medium has specific advantages and disadvantages, which helps decide their possible technical use.

For example, air can be blown through a cooling conduit in a turbulent manner, such as by compressed air, or in a turbulent-laminar manner, by blower air. The cooling effect can be varied over a wide temperature range, which is determined by the flow rate, the pressure which determines the flow conditions, and the specific heat capacity ($c_p$ 1.00 kJkg$^{-1}$ K$^{-1}$), which is a specific property of all materials. The heat capacity decides how much energy is absorbed by a material when the temperature is increased. The resultant cooling effect is even less for gaseous materials with low capacity by volume, if the volume which is sent through the respective cooling conduit, on an order of magnitude of 5 to 50 Nm$^3$/h, is made the basis, instead of the weight.

Water is always used in glass technology as cooling medium when the cooling effect of air is insufficient. However, the cooling effect is drastically increased in comparison to air. This is mainly the result of the heat capacity ($c_p$ 4.19 kJkg$^{-1}$ K$^{-1}$), which leads to large amounts of heat being removed at only small temperature changes. A strong cooling effect is particularly disadvantageous if the glass contact temperature is dropped below the transformation range of the respective glass, in this case tears and folds can arise in the glass flow, which lead to the respective products becoming scrap. The employment of water is always difficult, if not impossible, if setting the glass contact temperature over a wide temperature range is in a controlled manner. Also, the dead volume in the cooling conduit leads to evaporation of the water, which can greatly hamper a definite flow rate of the water, is also problematical. The relatively low evaporation temperature of 100° C. has also disadvantageous effects. It is possible to increase the evaporation temperature by increasing the pressure, but not in the desired amounts in order to be able to clearly expand the process window.

Oil as a cooling medium has the advantage of having a heat capacity which lies below that of water. But because of their flash points, oils make increased demands on the installation technology, which can only be used in certain processes.

SUMMARY OF THE INVENTION

It is one object of this invention to provide a method and a device for executing the method, which operate at a resultant cooling effect between that of air and water, without it being necessary to change the existing installation structure or the installation components for hot-molding flowable materials, for example glass, and which are also usable for the direct cooling of molded glass articles.

In connection with a method of this invention, this object is achieved with a mixture of compressed and/or blower air and a water aerosol fog is used as the cooling medium.

This cooling medium mixture is very stable in continuous operations, and also cost-effective and so universal, that it can cover the controlled temperature range for hot-molding demanded in glass technology, and can also be used for direct cooling of the molded glass articles.

The cooling effect can be changed by the flow rate of the compressed and/or blower air and the proportion of the water aerosol fog. For one, the cooling effect of this cooling medium mixture is based on heating processes, and for another also on evaporation processes.

While in connection with air cooling the cooling effect is customarily regulated by the amount of air, only the flow rate of the amount of air is maintained constant at approximately 10 Nm$^3$/h, and the amount of water is regulated to be between 0 and 8 l/h. However, the cooling effect can be further increased if, with identical amounts of water, the compressed and/or blower air supply is lowered to 6 Nm$^3$/h, and the water portion in the resulting mixed medium is additionally increased.

The cooling effect can be set over a wide temperature range, which achieves the cooling effect of compressed and/or blower air, as well as almost the cooling effect of water, as proven by practical measurements. Water includes a narrow temperature range of approximately 20° C. to 70° C., while a temperature range from 500° C. down to 280° C. can be governed by compressed and/or blower air which, however, must not be downwardly exceeded. With the novel cooling medium mixture it is possible to bridge the gap between air cooling and water cooling.

For improving comminution, in one embodiment the amount of water is superimposed on the compressed and/or blower air by using a water nozzle.

Stability of the cooling medium mixture of compressed and/or blower air with a water aerosol fog in continuous operation is achieved by the fine atomization of the water and the rotating movement of the carrier medium of air in the mixing nozzle. This also applies to a defined length into the cooling conduits of the molding unit. The mixing of both media should take place as closely as possible to the molding unit in order to prevent the extremely finely distributed water droplets from agglomerating into larger ones.

This mixing medium for cooling makes greater demands on the medium supply necessary. In accordance with one embodiment, filtered deionized water is used for the aerosol fog.

One important advantage is that the fine regulation of the glass contact temperature which, with some technical applications, remains stable just above the so-called adhesion temperature, for example the temperature at which the formed-out glass wets the mold surface.

In principle, the cooling medium mixture can be used in all cases of cooling. It can be used for a constant feed, as well as for technical requirements which rapidly change from a strong to a weak cooling effect, and vice versa. In this case it is also possible to operate with constant compressed and/or blower air, and the cooling medium can also be directly aimed on the surfaces of the molded glass articles, which are free in the molding unit, or on the molded glass article taken out of the molding unit.

A device for executing the method in accordance with this invention is distinguished, somewhat because compressed and/or blower air is radially introduced into a cylindrical mixing chamber. Water can be supplied to a centered, axially oriented mixing pipe in the mixing chamber, which is closed off by a water nozzle. The compressed and/or blower air rotating around the mixing pipe is mixed with the water aerosol fog exiting from the water nozzle and can be supplied via the adjoining outlet of the mixing chamber directly to the installation component, such as the molding unit, or is directed on the free surfaces of the glass article to be cooled.

The water, which is centrally fed into the mixing chamber, is finely atomized by the water nozzle which closes off the mixing pipe. Such nozzles are commercially available. The compressed and/or blower air is tangentially fed in, in order to obtain a rotating gas movement in the mixing pipe. The water aerosol fog is superimposed on the compressed and/or blower air in the mixing chamber, and a mixture is emitted at the outlet of the mixing chamber and is directly conducted to the cooling conduits of the installation component, such as the molding unit. The connection is provided by pressure lines.

BRIEF DESCRIPTION OF THE DRAWINGS

This invention is explained in greater detail in view of an exemplary embodiment represented in the drawings.

DESCRIPTION OF PREFERRED EMBODIMENTS

Figure 1A:
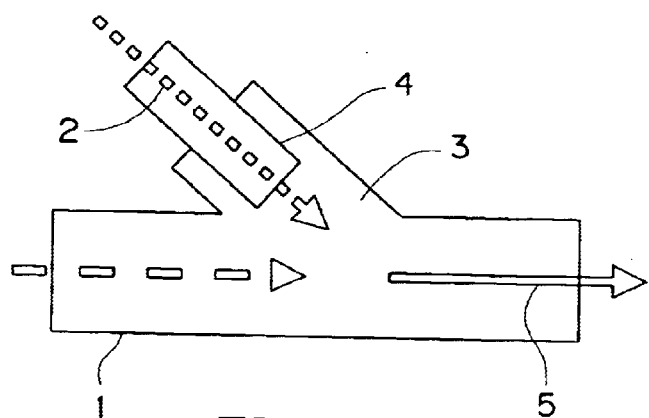
FIGS. 1a and 1b each schematically show in a plan view a device for mixing compressed and/or blower air with water.
Figure 1B:
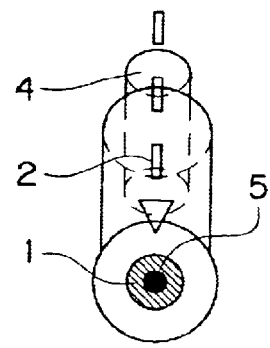

FIG. 1a shows a schematic lateral view, and FIG. 1b a view on the inlet side of a device for producing a cooling medium mixture of air and water. Compressed and/or blower air 1 is conducted to a mixing chamber 3, to which water in the form of a water aerosol fog is also supplied finely atomized by a water nozzle 4. The cooling medium in the form of compressed and/or blower air 1 and a water aerosol fog discharges out of the exit 5 of the mixing chamber 3 and can be directly supplied to the cooling conduits of the installation component, for example a molding unit, to be cooled. Commercially available water nozzles 4 can be used. The cooling medium mixture can also be aimed directly on a free surface of the molded glass article in the molding unit. However, it is also possible to cool the glass article removed from the molding unit directly by using the cooling medium mixture.

Figure 2A:
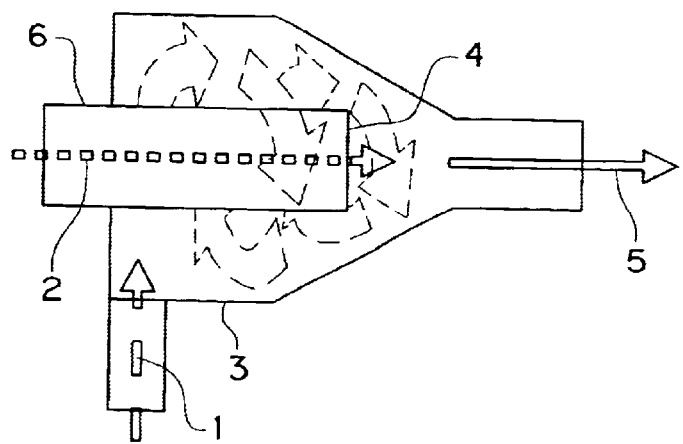
FIGS. 2a and 2b each show in a plan view a device for premixing two cooling media.
Figure 2B:
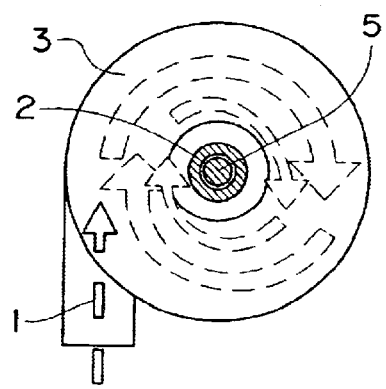

As the plan views in FIGS. 2a and 2b show, a cylindrical mixing chamber 3, which has a centrally inserted and oriented mixing pipe 6 for the supply of the compressed and/or blower air 1, is used in connection with an exemplary embodiment of a device. The compressed and/or blower air 1 is introduced radially and tangentially with respect to the mixing tube 6 and extends at an acute angle in relation to the center axis of the mixing tube 6. This results in a rotating movement around the mixing tube 6, which is closed off at one end by the water nozzle 4. Filtered and deionized water 2 is supplied to the mixing tube 6 which, conducted over the water nozzle 4, reaches the mixing chamber 3 as a water aerosol fog and is superimposed on the air vortex. The cooling medium mixture discharges at the outlet 5, which is reduced in diameter, of the mixing chamber 3 and is conducted to the object to be cooled, for example a molding unit in the hot zone of a glass production installation.

A device for regulating the amount of water can be connected upstream of the mixing tube 6 in order to vary the proportion of the amount of water in the cooling medium mixture. It is possible with this to control the glass contact temperature in a stable manner. A temperature range of 280° C. to 60° C., measured in the cooling medium, can be governed by means of such a cooling medium mixture if, for example, compressed air between 6 and 10 $Nm^3/h$ is conducted to the mixing chamber 3.

What is claimed is:

1. In a method for cooling components of an installation charged with a flowable media, such as a molding unit for at least one of a glass melt and a direct cooling of a molded glass part, the improvement comprising:

applying a cooling medium of a mixture of a water aerosol fog and at least one of a compressed air and a blower air (1), wherein a flow rate of the at least one of the compressed air and the blower air (1) is maintained constant, and a proportion of an amount (2) of water in the mixture is increased for increasing a cooling effect.

2. In the method in accordance with claim 1, wherein the flow rate of the at least one of the compressed air and the blower air (1) is maintained constant at approximately 10 $Nm^3/h$, an d the amount (2) of water is varied from 0 to 8 l/h.

3. In the method in accordance with claim 2, wherein the amount (2) of water is superimposed on the at least one of the compressed air and the blower air (1) by a water nozzle (4).

4. In the method in accordance with claim 3, wherein the at least one of the compressed air and the blower air (1) is brought into a rotating motion and is supplied to a mixing chamber (3) into which the water aerosol fog is also introduced.

5. In the method in accordance with claim 4, wherein the mixture of the water aerosol fog and the at least one of the compressed air and the blower air (1) is fed directly to the molding unit to be cooled through an outlet (5) of the mixing chamber (3).

6. In the method in accordance with claim 5, wherein filtered deionized water (2) is used for the water aerosol fog.

7. In the method in accordance claim 6, wherein an operation with the mixture of the water aerosol fog and the at least one of the compressed air and the blower air (1) is performed in a cooling range between 280° C. to 60° C.

8. In a device for performing a method in accordance with claim 7, wherein:

the at least one of the compressed air and the blower air (1) is radially introduced into the cylindrical mixing chamber (3), water (2) is supplied to a centered, axially oriented mixing pipe (6) within the mixing chamber (3), wherein the mixing pipe (6) is closed off by the water nozzle (4), and the at least one of the compressed and the blower air (1) rotating around the mixing pipe (6) is mixed with the water aerosol fog exiting from the water nozzle (4) and is supplied through the adjoining outlet (5) of the mixing chamber (3) directly to the installation component.

9. In the method in accordance with claim 1, wherein an amount (2) of water is superimposed on the at least one of the compressed air and the blower air (1) by a water nozzle (4).

10. In the method in accordance with claim 1, wherein the mixture of the water aerosol fog and the at least one of the compressed air and the blower air (1) is fed directly to the molding unit to be cooled through an outlet (5) of the mixing chamber (3).

11. In the method in accordance with claim 1, wherein filtered deionized water (2) is used for the water aerosol fog.

12. In a device for performing a method for cooling components of an installation charged with a flowable media, such as a molding unit for at least one of a glass melt and a direct cooling of a molded glass part, the improvement comprising:

applying a cooling medium of a mixture of a water aerosol fog and at least one of a compressed air and a blower air (1), wherein:

the at least one of the compressed air and the blower air (1) is radially introduced into a cylindrical mixing chamber (3), water (2) is supplied to a centered, axially oriented mixing pipe (6) within the mixing chamber (3), wherein the mixing pipe (6) is closed off by a water nozzle (4), and the at least one of the compressed and the blower air (1) rotating around the mixing pipe (6) is mixed with the water aerosol fog exiting from the water nozzle (4) and is supplied through an adjoining outlet (5) of the mixing chamber (3) directly to the installation component.

13. In a method for cooling components of an installation charged with a flowable media, such as a molding unit for at least one of a glass melt and a direct cooling of a molded glass part, the improvement comprising:

applying a cooling medium of a mixture of a water aerosol fog and at least one of a compressed air and a blower air (1), wherein the at least one of the compressed air and the blower air (1) is brought into a rotating motion and is supplied to a mixing chamber (3) into which the water aerosol fog is also introduced.

14. In a method for cooling components of an installation charged with a flowable media, such as a molding unit for at least one of a glass melt and a direct cooling of a molded glass part, the improvement comprising:

applying a cooling medium of a mixture of a water aerosol fog and at least one of a compressed air and a blower air (1), wherein an operation with the mixture of the water aerosol fog and the at least one of the compressed air and the blower air (1) is performed in a cooling range between 280° C. to 60° C.

* * * * *